UNITED STATES PATENT OFFICE.

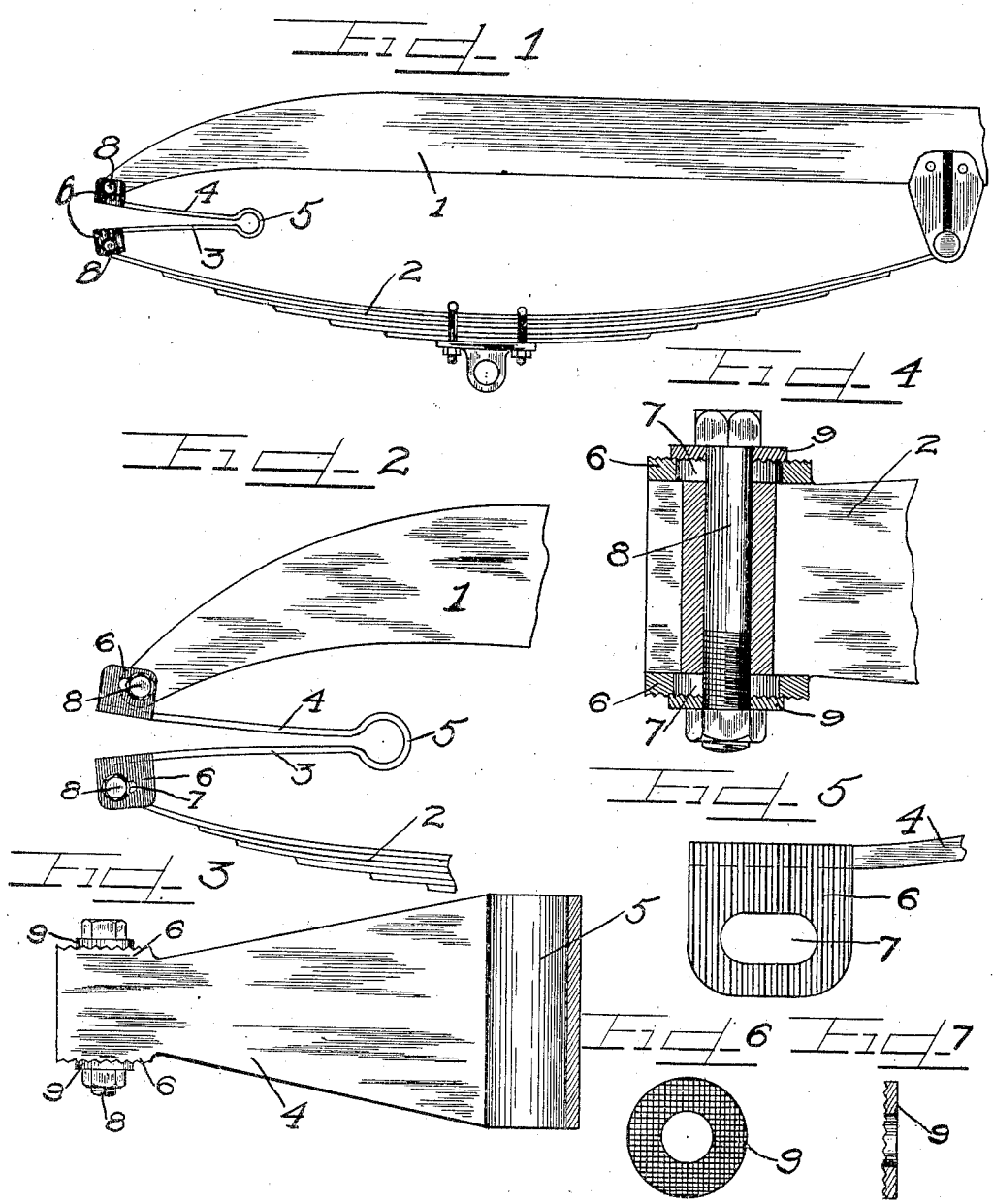

NATHAN SCHACHTER, OF CHICAGO, ILLINOIS.

SHOCK-ABSORBER AND AUXILIARY SPRING.

1,326,467.   Specification of Letters Patent.   Patented Dec. 30, 1919.

Application filed October 30, 1917. Serial No. 199,303.

*To all whom it may concern:*

Be it known that I, NATHAN SCHACHTER, a former subject of the King of Roumania, (who has declared his intention of becoming a citizen of the United States,) and a resident of the city of Chicago, in the county of Cook and State of Illinois, have invented certain new and useful Improvements in Shock-Absorbers and Auxiliary Springs; and I do hereby declare that the following is a full, clear, and exact description of the same, reference being had to the accompanying drawings, and to the numerals of reference marked thereon, which form a part of this specification.

In shock absorbers of this class, it is desirable to have the free end of the absorber spaced an equal distance from the spring and chassis so that an equal amount of action is permitted between the absorber and both the main spring and chassis frame.

Heretofore, in different makes of cars, it has been a matter of considerable difficulty to attach absorbers of this class as the centers of attachment of the spring and frame are often out of alinement; *i. e.*, the eye of the spring projects outwardly beyond or terminates inwardly of the end of the chassis and the shock absorber assumes an angle such that the free end is nearer to the chassis than the spring, or vice versa, which prevents free action of the auxiliary spring and absorber.

It is an object of this invention to provide an absorber and attaching means whereby the same may be attached to the end of the main spring and chassis in such a manner that the absorber will lie in a horizontal position whether the spring end and chassis frame end are in vertical alinement or not.

It is further an object of this invention to provide an attaching means for auxiliary springs and absorbers by means of which devices of this class may be attached and when attached lie in a position to be equally distant from the chassis and spring or lie in any other angle, should the occasion demand it, irrespective of whether the ends of the main spring and chassis frame are in vertical alinement or not.

It is further an object of this invention to provide an attaching means which will hold the auxiliary spring and absorber in the position in which it is attached and prevent the free end from shifting from any cause.

The invention (in a preferred form) is illustrated in the drawings and hereinafter more fully described.

On the drawings:

Figure 1 is a fragmentary side elevation of a chassis frame and spring between which an absorber and spring embodying my invention is inserted.

Fig. 2 is a similar fragmentary view which shows the absorber connected between a chassis and spring in which the ends are out of vertical alinement.

Fig. 3 is a horizontal section taken between the leaves through the spring or free end.

Fig. 4 is an enlarged section taken through one of the attaching bolts.

Fig. 5 is an enlarged detail illustrating one of the attaching lugs or plates.

Figs. 6 and 7 are enlarged views of the washer.

As shown on the drawings:

1, indicates one of the side frame members of a chassis and 2, one of the main springs between the outer ends of which a shock absorber and spring embodying my invention is placed.

Said absorber and spring comprises leaf members 3—4, which are integral with and are tapered and diverged outwardly from the resilient loop 5, and have their outer ends connected with the frame member 1, and spring 2, respectively.

Integral or otherwise rigidly secured to the attaching ends of the leaves 3—4, are lugs or plates 6, each of which is corrugated, milled or roughened on its outer face and each is provided with an elongated slot 7, through which an attaching bolt 8, is adapted to engage. Engaged on said attaching bolt 8, one on the outside of each lug, is a washer 9, which has a milled or corrugated face adapted, when the nut is tightened on the bolt, to rigidly engage the corrugations of the lugs or plates 6, The operation is as follows:

Where the ends of the chassis frame member and spring are in vertical alinement as shown in Fig. 1, the attaching bolts 8, extend through the center of the slots 7, which positions the absorbers in horizontal position.

In Fig. 2, the ends of the frame member and spring are out of vertical alinement. With the old style of devices, in order to attach the absorber, the same could not lie properly positioned, but the end 5, would lie either closer to the frame member or spring 5, and the uneven distribution of space would prevent proper working of the absorber. However, with this improved device, as shown in Fig. 2, the upper bolt 8, engages in one end of the slots in the upper lugs and the lower bolt in the opposite ends of the slots in the lower lugs which permits the absorber lying in a horizontal plane even though the ends are out of vertical alinement. If the frame projected beyond the spring the position of the bolts in the slots would be reversed, but nevertheless, the auxiliary spring and absorber would be properly placed.

The amplitude of adjustment of said attaching means is such as to permit the absorber being properly positioned through a wide range of variation in the relative positions of the ends of the frame member and spring and the corrugated faces of the plates and washers when clamped together form a rigid construction which holds the absorber in the position in which attached.

Obviously, where the amplitude of adjustment required is not great the absorber may be made with ordinary connecting means without the slot at the outer end of one of the arms and the other arm only may have the slotted connecting means whereby adjustment is provided.

Also other changes may be made and numerous details of construction may be varied without departing from the principles of my invention and I therefore do not desire to limit this application for patent otherwise than necessitated by the prior art.

I claim as my invention:

1. A shock absorber comprising upper and lower leaves, a spring integrally connecting the same at one end and slotted attaching members integral with the free ends of the leaves.

2. In a device of the class described, a pair of leaves, a spring portion connecting the leaves and slotted plates integral with the free ends of the leaves.

3. In a device of the class described, a pair of leaves, a spring portion connecting the leaves, slotted plates integral with the free ends of the leaves, each provided with a corrugated face and corrugated or roughened members adapted to be clamped against said corrugated plates to hold the device in attached position.

4. In a device of the class described, leaf members, a spring member connecting the same at one end and corrugated slotted attaching plates integral with the free ends of the leaves.

5. In a device of the class described, leaf members, a spring member connecting the same at one end, corrugated slotted attaching plates integral with the free ends of the leaves and washers having roughened faces adapted to coact with the corrugations in clamping the attaching plates in position.

6. The combination with a vehicle part and a relatively movable main leaf spring, of a shock absorber intermediate thereof and comprising a resilient member having a pair of correspondingly extending arms joined at their inner ends, and means for connecting the outer ends of said arms with the vehicle part and the end of the main leaf spring, said means including an adjustable connector and locking means for holding the connector in its adjusted position.

7. The combination with a vehicle part and a relatively movable main leaf spring, of a shock absorber intermediate thereof and comprising a resilient member having a pair of correspondingly extending arms joined at their inner ends, and means for connecting the outer ends of said arms with the vehicle part and the end of the main leaf spring, said means including a connector adapted to be adjusted to regulate the position of the inner ends of the arms with reference to the vehicle part and the main leaf spring.

8. In a device of the class described, the combination of a resilient member having a pair of diverging arms joined at their inner converging ends and a slotted attaching member fixed to the outer end of one of the arms, said slot extending substantially perpendicularly to the line joining the outer ends of the arms.

9. In a device of the class described, the combination of a resilient member having a pair of diverging arms joined at their inner converging ends, an attaching member at the outer end of one of the arms having a slot therein extending lengthwise of the arm, an auxiliary attaching member coöperating with the slotted attaching member, and locking means for holding the auxiliary attaching member relatively to the slotted member.

10. In a device of the class described, the combination of a resilient member having a pair of diverging arms joined at their inner converging ends, an attaching member at the outer end of one of the arms having a slot therein, and an auxiliary perforated attaching member adapted to coöperate with the slotted attaching member, said attaching member and auxiliary attaching member being provided with matching serrated faces for holding the auxiliary member relatively to the slotted member.

11. In a device of the class described, the combination of a resilient member having a pair of tapered arms joined at their enlarged inner ends and integral slotted attaching ears at the outer end of one of the arms.

In testimony whereof I have hereunto subscribed my name in the presence of two subscribing witnesses.

NATHAN SCHACHTER.

Witnesses:
CHARLES W. HILLS, Jr.,
EARL M. HARDINE.